June 4, 1940. T. H. CLARKSON-JONES 2,202,834
DOOR LOCKING SYSTEM
Filed March 16, 1938 3 Sheets-Sheet 1

INVENTOR.
THOMAS H. CLARKSON-JONES
BY
Parker & Burton
ATTORNEYS

Patented June 4, 1940

2,202,834

UNITED STATES PATENT OFFICE 2,202,834

DOOR LOCKING SYSTEM

Thomas H. Clarkson-Jones, Toronto, Ontario, Canada

Application March 16, 1938, Serial No. 196,237

22 Claims. (Cl. 70—264)

This invention relates to door locking systems for locking and unlocking a plurality of doors and more particularly to the control mechanism for such system especially adaptable for use in motor vehicles.

In my copending application, Serial No. 184,516, filed January 12, 1938, there is illustrated and described a system for locking and unlocking all the doors of a vehicle from a remote control. The system described in the copending application relates primarily to the construction of the locking devices and the cable control connecting a plurality of devices together for joint operation.

The present invention relates primarily to control devices for actuating the system from a single point in the vehicle. It is an important object of the present invention to provide novel control mechanism in the system adapted to lock or unlock the system from the outside and the inside of the vehicle. The control mechanism may be key-operated from the outside of the vehicle and manually operated from the inside of the vehicle. The system is constructed in a novel way so that it is self operable in one direction when certain control movements are made. Thus it is possible, as illustrated herein, to provide a manual control inside the vehicle, such as a push button, which upon movement in one direction will release the system for movement in its self operating direction.

The control mechanism for the system is preferably housed in a casing separate from the door locking devices so that the latter may be positioned lower down on the side of the vehicle where they are more effective for holding the doors closed against unauthorized attempts to open the doors. As a result, the control mechanism may be conveniently located in another position of the vehicle such as further up on one side of the vehicle. However, if desired, the inside operating controls may be located upon the dash panel in the front compartment of the vehicle.

Another important object of this invention is to provide novel key locking means for the system which is key-operated from the outside of the vehicle, and a novel inside manual control therefor which is capable of releasing the key mechanism for turning movements from the inside of the vehicle. The inside and outside controls are cooperatively associated together and are preferably mounted in the same housing. The inside manual control includes novel connections which operate upon the locking elements or tumblers in the key-operated locking mechanism proper, and when operated to one position are capable of shifting the tumblers to the same position to which the proper key for the lock mechanism is capable of doing. Thus the inside manual control is able to release the outside key-operated lock mechanism for turning movements.

The door locking system is as previously mentioned constructed in a novel manner for self-operation in one direction. This is preferably accomplished by the provision of springs which tension the system in one direction but which are yieldable to manual force applied to operate the system in the other direction. Key operated mechanism is capable of releasably holding or cocking the system in the position opposed to the yielding means. The inside manual control including the novel elements associated therewith is therefore able upon simple movement, such as by depression of a push button, to cause the system to move in one direction and either lock or unlock the doors of the vehicle. In the embodiment of the invention illustrated herein the system is tensioned to move the lock bolts of the locking devices into locking engagement with the doors of the vehicle. The inside manual control herein illustrated is therefore able to release the system for locking engagement with the doors of the vehicle.

Other objects, advantages and meritorious features of the invention will become more apparent from the following specification, appended claims and accompanying drawings wherein:

Figures 1, 9, 10, 11, 12:
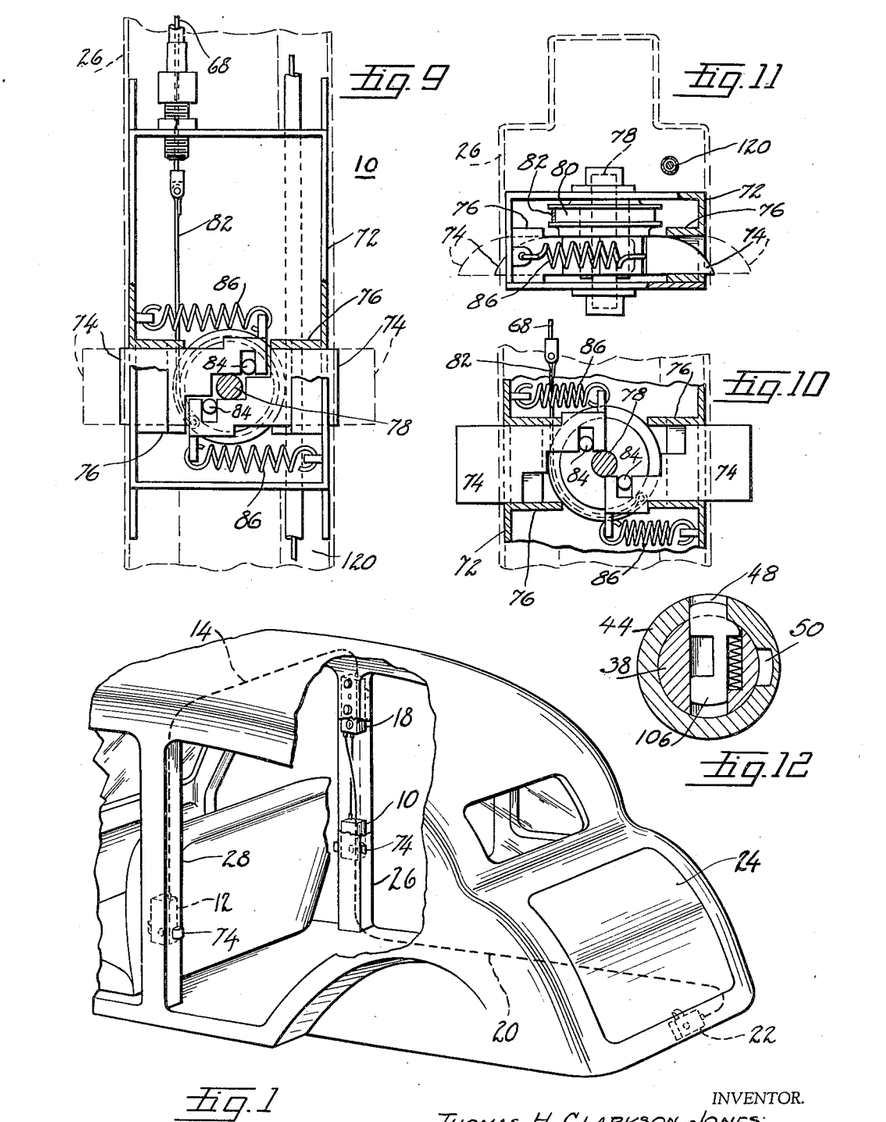
Figure 1 is a schematic view illustrating one manner of employing the system on a motor vehicle and includes a view of a main door locking system and an auxiliary compartment locking system.
Fig. 9 is an inside elevational view of one of the door locking devices showing its mounting in a pillar post.
Fig. 10 is a detail view of the door locking device of Fig. 9 showing another position of the lock bolts.
Fig. 11 is a horizontal cross-sectional view through the door locking device of Fig. 9.
Fig. 12 is an enlarged detail view showing the construction of the tumblers in the outside key-operated locking device.

Referring particularly to Fig. 1 of the drawings, the door locking system comprises, in general, a locking device 10 on one side of the vehicle and a locking device 12 on the opposite side of the vehicle. These separate locking devices are operatively connected together for joint operation. In the embodiment of the invention illustrated herein these devices are mechanically connected together by a flexible cable system 14 but it is understood that other forms of operating connections such as electrical connections may be used to operate the system. The principles of the control mechanism described herein are applicable to both types of connections.

The locking devices may be of a kind illustrated in my copending application, Serial No. 184,516, wherein these devices are mounted in the door or pillar posts on the opposite side of the vehicle against which a pair of doors on each side of the vehicle abut in closed position. These locking devices in such a construction are provided with a pair of latch bolts which are capable of being projected in opposite directions into locking engagement with the doors on opposite sides of the pillar posts.

Figure 2:
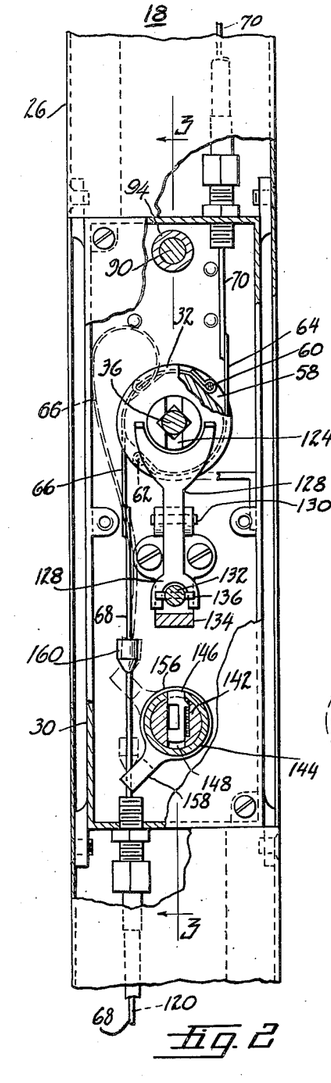
Fig. 2 is an elevational view of the control mechanism and its mounting in a pillar post of a motor vehicle partially broken away along substantially line 2—2 of Fig. 3.

Spaced from the locking devices as shown in Figs. 1 and 2 is a control mechanism generally indicated at 18. This control mechanism is provided with a key operated mechanism operable from the outside of the vehicle and with two manual controls on the inside of the vehicle. The control mechanism 18 is preferably mounted in a convenient place in a motor vehicle such as in one of the pillar posts above the locking devices mounted therein. By separating the control mechanism from the locking devices it is possible to install the locking devices at a point lower down in the pillar posts where they are best suited for locking the doors and for withstanding any forces imposed on these doors to open them when they are in locked condition. As shown, the control mechanism is mounted in the right hand side pillar post 26 of the motor vehicle. The door locking device 10 is shown mounted below the control mechanism. The door locking device 12 for the doors on the other side of the motor vehicle is shown in the left side pillar post 28 on the same level as device 10.

An auxiliary locking system is associated with the main locking system and may control the lock of a trunk compartment or the hood over the engine or any other compartment which it is desired to lock. In Figure 1 the auxiliary system 20 is shown leading to the lock 22 for the cover 24 of the trunk compartment. It is understood that the auxiliary system might be connected to a lock for the engine hood or other form of closure if desired.

Figure 3:
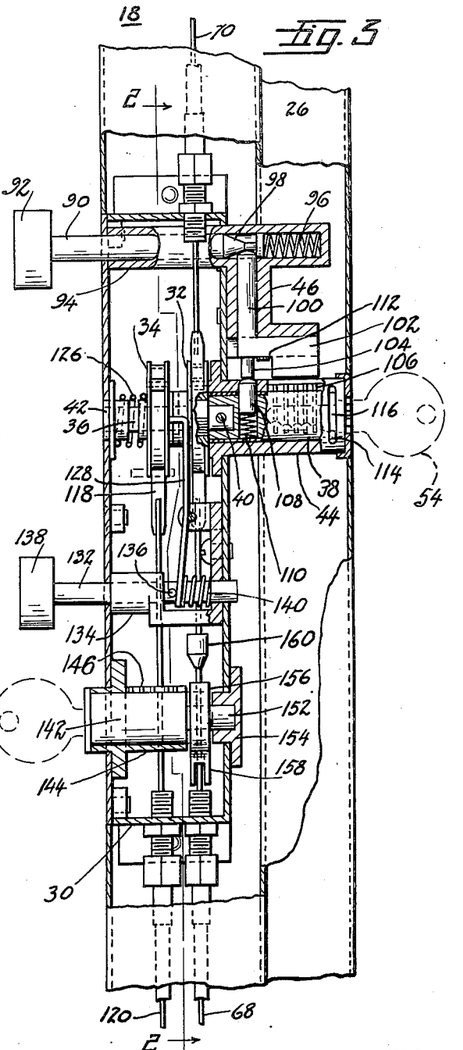
Fig. 3 is a vertical cross-sectional view through the control mechanism and its mounting in a pillar post of a motor vehicle along line 3—3 in Fig. 2.
Figures 4, 5, 6, 7, 8:
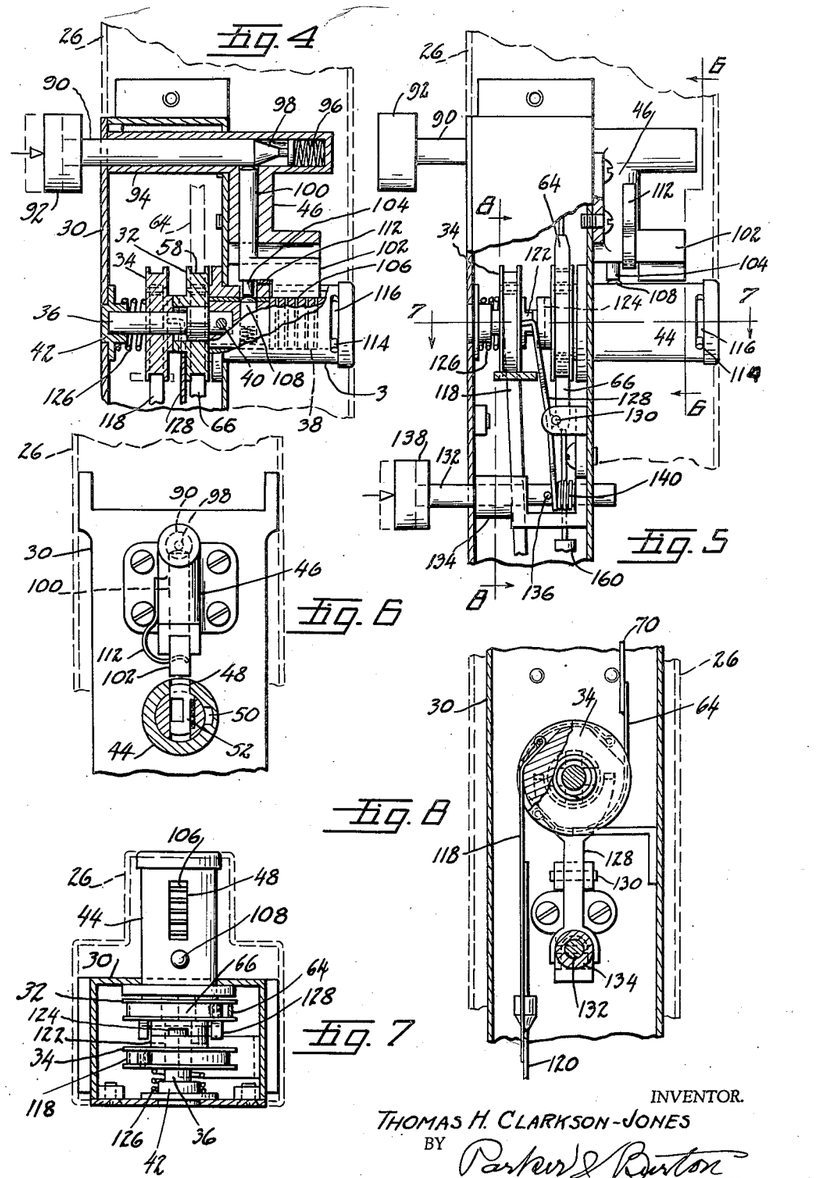
Fig. 4 is a detail cross-sectional view of the upper part of the control mechanism illustrated in Fig. 3 showing another position of its operation.
Fig. 5 is a detail cross-sectional view of the middle portion of the control mechanism illustrated in Fig. 3 showing another position of its operation.
Fig. 6 is a vertical cross-sectional view of the control mechanism along line 6—6 of Fig. 5 showing the manner of operating the tumblers of an outside operated locking device from an inside control.
Fig. 7 is a horizontal cross-sectional view of the control mechanism along line 7—7 of Fig. 5.
Fig. 8 is an inside front elevational view of the yoke device provided in the control mechanism for disconnectedly coupling an auxiliary locking system into the main door locking system.

The control mechanism 18 as shown in detail in Figs. 2 and 3 is mounted within a housing or casing 30. Within this casing, a pair of drums 32 and 34 are mounted on a shaft 36 and coaxially with a rotatable lock barrel 38 which projects outwardly of the vehicle. Drum 32 is fixed to the shaft such as by squaring the shaft while drum 34 is slidable axially along the shaft. One end of shaft 36 is fixed to the lock barrel such as by pin 40. The other end is rotatably journaled in a bearing 42 fixed to the inside wall of the housing 30. The lock barrel is rotatably mounted in a sleeve 44 forming an integral part of a subsidiary housing 46 secured to the back side of the housing 30 between the housing and the outside wall section of the pillar post. The inner wall of the sleeve 44 is slotted longitudinally at circumferentially spaced points 48 and 50 as shown in Figures 6 and 12. Slot 48 is shown as opening through the top of the sleeve 44. Reciprocating radially within the lock barrel are tumblers or locking elements 52 which are spring pressed to enter the slots and to lock the barrel against rotation in the customary manner. The insertion of a proper key 54 will retract these tumblers so that the barrel may be rotated. Rotation of the barrel will rotate the drums 32 and 34 as will be described more fully hereinafter.

Drum 32 may be considered as the primary drum because it is operatively coupled in the system for locking and unlocking the doors of the vehicle. Drum 34 may be considered as an auxiliary drum because it is operatively associated in an auxiliary locking system for controlling a remote locking device such as the locking device 22 for the trunk compartment of the motor vehicle. Drum 34, as will be more fully pointed out hereinafter, is disconnectedly coupled into the main door locking system and may be actuated separately at the wish of the operator.

The drum 32 is provided with a peripheral groove 58 having a relatively wide flat bottom as shown. Attached to the drum as by diametrically opposite pins 60 and 62 in Figure 2 are two flexible metal strips or tapes 64 and 66 which when tensioned contactually lie against the bottom of the groove. The free ends of the tapes 64 and 66 are connected to flexible cables 70 and 68 respectively which are preferably round and of relatively small diameter. Cable 68 extends vertically downward through the bottom of the casing 30 and connects the control mechanism 18 with the door locking device 10 mounted therebelow in the same pillar post. Cable 70 extends upwardly through the top of the casing 30 and leads to the locking device 12 in the other pillar post. As shown it may extend across the top of the motor vehicle and form the operating connection indicated at 14 in Figure 1. Each cable is preferably sheathed within a covering which may be attached to the casing 30 in the manner described in detail in my copending application.

It is obvious from the manner in which the flexible metal tapes 64 and 66 are attached to the drum 32 that clockwise rotation of the drum in Figure 2 will wrap the tapes about the drum and tension the cables 68 and 70, and that counter-clockwise rotation of the drum will release the tension on the cables. As previously explained, the cables lead to the door locking devices and operate the same from the control mechanism. The door locking devices 10 and 12 are similar in construction. They each contain a pair of lock bolts reciprocally mounted for movement in opposite directions. In one of their positions of movement the lock bolts project from the opposite sides of the pillar post to engage and lock the front and rear doors on that side of the vehicle. In these retracted positions of the lock bolts the doors are released for opening movement.

The door locking devices 10 and 12 may be like that shown in my copending application Serial No. 184,516 wherein springs are provided which urge the bolts to retracted position or they may be constructed as described herein wherein springs are provided which urge the bolts to projected locking position. In either case the springs are of sufficient strength to operate the bolts and the cable to which they are attached and thus render the systems self-operable in one direction of its movement.

Since the door locking devices of the present embodiment are the same in construction, the door locking device 10 in the right side pillar post will be described. The device comprises a casing 72 having a pair of lock bolts 74 reciprocally mounted for movement in guides 76. The inner ends of these bolts are similarly but irregularly shaped to overlap upon a shaft 78. A drum 80 similar in construction to drums 32 and 34 is fixed on the shaft 78. It is provided with a peripheral groove in which a flat metal strip 82 may wind. This strip is attached at one end to the bottom of the groove on the drum and at the other end to the flexible cable 68 which enters through the top of the casing. Laterally projecting pins 84 are provided on the drum which, as shown, interfit with the inner ends of the bolts to couple the latter to the drum. A spring 86 associated with each bolt tensions the latter to the casing as shown so that the bolts are continuously urged toward their projected locked position. The lock bolts are shown in unlocked position in Fig. 9 and in locked position in Fig. 10. In Fig. 9 the springs 86 are tensioned and exerting their maximum force on the bolts.

Returning to the description of the control mechanism 18, a plunger 90 is slidably mounted in the uper part of the control housing and is provided with a manual control knob 92 in the form of a push button. The subsidiary housing 46 previously referred to has a sleeve 94 projecting toward the front face of the control mechanism forming a guide for the plunger, A spring 96 in the back end of the guiding sleeve resiliently urges the plunger outward. Intermediate the ends of the plunger there is provided a tapered section 98 which is adapted to ride over a depressible member 100 carrying a laterally projecting part 102 and a heel portion 104. These parts 100, 102 and 104 are integral with one another and form in general an L-shape construction as shown in Figure 3. The laterally projecting part 102 is of a width substantially equal to that of the tumblers 106 reciprocally mounted in the lock barrel and is capable of engaging the tops of the tumblers through the open topped slot 48 (Figure 6) in the sleeve 44. The heel portion 104 bears upon the top of a spring-pressed plunger 108 reciprocally mounted in the lock barrel 38 as shown in Fig. 3. The spring for this plunger is indicated at 110. A hole is provided in the sleeve 44 opposite the heel portion 104 through which the plunger 108 projects into contact with the heel portion.

It is obvious from the construction described in the previous paragraph that upon inward reciprocation of the plunger 90 the parts of the L-shaped construction 100—102—104 are moved downward against the tumblers and the plunger and cause these elements to be depressed within the body of the lock barrel. When such depression takes place the lock barrel is free for turning movement. The springs 86 in the locking devices continually exert forces through the system and when the barrel is free for movement will rotate the same in one direction as will be more fully described hereinafter. The plunger normally projects higher than the tumblers 106 and is of the same size in diameter as the width of the tumblers so that when it is in projecting position the plunger takes the strain off the tumblers. If the plunger is omitted, the tumblers would be subjected to the force of the spring 86 and bind or become damaged after considerable use. The plunger 108 relieves such pressure so that the tumblers may be easily worked in the key slots of the sleeve 44.

In order to return the L-shaped member comprising the elements 100—102—104 to its initial operation position against the tapered section 98 of the plunger 90, a spring strip 112 is attached to the body in which the member reciprocates and is provided with an end portion which extends under such member preferably between the heel portion 104 and the lateral projecting part 102. This construction is shown in Figs. 5 and 6 and it is obvious that the spring strip yieldingly supports the member to its raised position against the taper of the plunger 90. Only one such hole is provided in the sleeve 44 through which the plunger 108 may project. This hole, as previously explained, is disposed opposite the heel 104 so that the plunger may rise into engagement therewith. When the plunger is depressed within the lock barrel 38 and the latter is turned, the plunger is retained in such depressed condition against the inside surface of the sleeve until the lock barrel is returned to its initial operating position. The tumblers 106, however, are capable upon a ninety degree turn of the lock barrel to rise through the slot 50 of the sleeve 44 and lock the barrel against rotation. Since the drum 32, shaft 36 and lock barrel 38 are integrally joined together, they are locked against movement in either of the two positions in which the tumblers enter the slots 48 or 50.

The parts of the systems are so proportioned that the two locking positions of the lock barrel correspond to the two extreme positions of the lock bolts in the devices 10 and 12. In the position of the lock barrel in which the tumblers enter the open topped slot 48, the lock bolts are in their retracted spring-tensioned position. In the position of the lock barrel in which the tumblers enter the slot 50, the lock bolts extend in their fully projected position. To limit the rotation of the lock barrel to these two positions, a pin 114 is provided on the barrel which rides in a slot 116 having a length equivalent to the amount of rotation necessary to bring the tumblers opposite the slots 48 and 50. The tumblers may be of any suitable form. They may be constructed as shown in Fig. 12.

Drum 34, as previously explained, is provided for controlling an auxiliary lock system. A flexible metal tape is secured to this drum in the same manner as the tape is secured to the main drum 32. This metal tape 118 in turn is connected to the flexible cable 120 which leads to the locking devices controlled in the auxiliary system. To control the auxiliary lock system independently of the main system, the drum 34 is capable of disengagement from the operative connections with the lock barrel and drum 32. This is accomplished by slidably and rotatably mounting drum 34 upon the shaft 36 and providing a clutch mechanism between the two drums. This clutch may take the form of that illustrated in the drawings wherein a projection 122 extending diametrically of drum 34 is capable of entering a similarly extending groove 124 in the outside face of drum 32. A spring 126 encircling the shaft 36 yieldingly urges the drum 34 into clutch engagement with the drum 32 so that normally both drums are rotated when the lock barrel 38 is rotated.

In order to control the auxiliary system independently of the main system, a yoke 128 is provided which extends between the two drums and is capable upon swinging movement around its pivot 130 to thrust the drum 34 outward against the spring 126 and declutch the drums from one another. The opposite or lower end of the yoke is operated upon by a plunger shaft 132 reciprocable in a guide 134 and having a pin 136 abutting the lower extremity of the yoke. The plunger carries a knob 138 similar in construction to the push button 92. A spring 140 yieldingly urges the plunger shaft 132 outward of the casing 30. It is apparent that upon inward movement of the knob 138 the yoke 128 will swing and cause the disengagement of drum 34 from drum 32.

As will be described more fully hereinafter in connection with the operation of the control mechanism, the system is provided with key operated mechanism for unlocking the doors from the inside of the motor vehicle. By utilizing a key operated mechanism instead of a simple inside manual control it will prevent an illegal entry into the vehicle by smashing a window and reaching in from the outside to operate the manual control which is now possible in conventional motor vehicle constructions. This key operated mechanism is preferably disposed in the right hand side pillar post in the cable system leading to the door locking device 10 on that side of the vehicle. It is so constructed and operated that it will unlock this door locking device but is ineffective to unlock the other door locking device in the other pillar post or that door locking device associated with the auxiliary system.

Referring to Figs. 2 and 3, a lock barrel 142 is rotatably supported in a cylinder 144 fixed to the housing 30 and is provided with locking elements or tumblers 146 similar to 106 which are capable of entering a slot 148 in the cylinder. All the tumblers 146 are retractible from the slot 148 when the proper key is inserted. The lock barrel is provided with a pin 152 which rotatably journals the inner end of the lock barrel to an appropriate support 154. Adjacent to the inner end of the lock barrel there is provided a collar 156 fixed to pin 152 and having a slotted or forked lever 158 which embraces the cable 68 leading to the door locking device therebelow. An adjustable ferrule 160 on the cable 68 bears upon the upper side of the forked end of lever 158. The key slot of the lock barrel 142 opens to the inside of the vehicle as indicated by the dotted line of the key. Turning movement of the key will rotate the barrel, collar and associated lever.

When the main system is locked, the ferrule 160 is disposed in its lower position indicated in dotted outline. In this position, clockwise movement of the lever 158 will engage the ferrule and raise the cable and the tape to which it is attached so that the tape will leave the periphery of the drum 32 and assume the dotted position in Fig. 2. The drawing-up movement of the cable 68 will actuate the door locking device 10 and retract the lock bolts therein to unlocked position, thus permitting opening movement of the doors on the right hand side of the vehicle.

The inside key operated mechanism, including the lock barrel 142, collar 156 and lever 158 is shown mounted in the lower part of the housing 30 of the central control mechanism. It might, however, be mounted in a separate casing below the housing 30 or mounted on the axis of the operating drum in the locking device 10.

In operation, the main and auxiliary systems are capable of self operation in one direction and, as explained heretofore, might automatically operate in the direction to unlock the doors as described in my copending application, Serial No. 184,516, or automatically operate in the direction to lock all the doors of the vehicle as in the present embodiment of the invention. In the structure illustrated in the drawings herein, the systems are held in tensioned or cocked position by the plunger 108 and the tumblers 106 of the outside key operated mechanism disposed in the upper part of the control unit 18. To release the bolt systems for self operation, all that it is necessary to do is to depress the push button 92. This will force the tumblers and plunger inside the lock barrel 44. The stored energy in the springs 86 of the locking devices 10 and 12 will operate the main system to locked position and the springs in the locking device 22 of the auxiliary system will operate that system to the locked position. Thus upon depression of the push button 92 all the doors of the vehicle and the closure member of the trunk compartment may be instantly locked from the inside of the vehicle.

To lock the vehicle in unoccupied condition the system is operated to the locked condition from the inside of the vehicle as previously described. The occupant of the vehicle then inserts a key into the lock barrel 142 and turns it a quarter of a turn in a clockwise direction. This will draw-up the cable 68 leading to the locking device 10 on the right hand side of the vehicle causing the tape 66 to assume the dotted position shown in Fig. 2 while at the same time retracting the bolts 74 of device 10 against the tension of springs 86 and thus unlocking the doors on the right hand side of the vehicle. While holding the key thus inserted in its turned position, the doors on the right hand side of the vehicle may be unlatched and opened. After one or both doors on this side of the vehicle are opened, the occupant may withdraw the key and step out of the vehicle. The lock bolts in the locking device 10 will then immediately snap back into locked position. Upon slamming shut the open door or doors, if one or both doors are opened as the case may be, the striker plates on these doors will ride against the outwardly cammed portions of the bolts 74 and force these bolts momentarily inward until the doors on the right hand side of the vehicle are fully closed at which time the springs 86 will automatically return the bolts to their projected locked position. As the bolts are forced inwardly by the camming action of the striker plates, the drum 80 controlling these bolts is rotated in unlocking direction causing the tape 82 to partially unwind and flex outwardly from the drum in the manner like tape 66 as shown in Fig. 2. When the bolts assume their projected position the vehicle will then be in fully locked unoccupied condition. No one can gain access to the interior of the vehicle by breaking a window and opening the doors from the inside by releasing a manual control.

To open the locked vehicle from the outside, a proper key 54 is inserted in the outside operated lock barrel 38. In locked position the tumblers 106 of the barrel project into locking engagement with the side slot 50. The plunger 108, however, is held in retracted position because its head bears against the inner surface of the cylinder 44 in this position of the barrel. Upon insertion of the key 54, the tumblers are retracted from slots 50. Turning this key a quarter of a turn in a counter-clockwise direction will bring the tumblers and plunger respectively opposite the top slot 48 and the hole in the cylinder 44 opposite the hole 104. In this position these elements are projected into locked position by their respective springs. This holds the system in unlocked condition against the force exerted continuously by the stored energy in the tensioned spring 86 of the locking devices.

The auxiliary system leading to the trunk compartment or other enclosed structure which it is desired to lock, operates jointly with the main system unless a special operating step is performed to operate the system separately. It is many times desirable to leave the vehicle unlocked but to have the trunk compartment locked. This is particularly true when the vehicle is serviced in a garage.

In such a case, the occupant when leaving the vehicle in unlocked condition simply depresses the lower push button 138 of the control unit 18. This movement swings the yoke 128 and declutches drum 34 from drum 32 so that it is freely rotatable on shaft 36. The auxiliary system will then automatically function to lock the compartment. The type of locking device in this system may be similar to that described in connection with the doors of the vehicle. It may contain a drum about which the cable leading thereto may be wound and a retractible lock bolt tensioned by a spring toward projecting locked position. This spring will, when the drum 34 is free for rotation, force the lock bolt to projected position, winding the cable and rotating drum 34 to the position it assumes when it is clutched to drum 32 and the main system is operated to locked condition.

To return the auxiliary system to unlocked condition, the main system is first operated to the locked condition so that the drum 34 is forced by spring 126 into clutching engagement with drum 32. Upon operating the main system to the unlocked condition, such as by means of the key 54, the auxiliary system is operated along therewith to unlocked cocked position.

What I claim is:

1. In a door enclosed structure having a plurality of doors for entering and leaving and door locking devices associated with each door, a system operatively coupling said door locking devices together for joint operation, power means in said system exerting a force thereon sufficient to operate the door locking devices to lock all the doors simultaneously, means for holding said system in unlocked condition against the force exerted by said power means, key means operable from the outside of said structure for unlocking the system when the same has been locked by said power means, and control means operable from the inside of said enclosed structure for releasing said system from the control of said holding means so that it may be operated to locked condition by said power means.

2. A locking system for an enclosed structure having a plurality of doors comprising, in combination, a door locking device associated with each door having a bolt operable into locked or unlocked position, means tensioning said devices for simultaneously operating the bolts thereof to one position of their movement, key operated control means including a rotatable lock barrel having locking elements adapted to lock the barrel in either of two positions of rotation corresponding to the locked and unlocked positions of said bolts, said tensioning means coupled to said barrel to rotate the barrel from one position to the other upon release of said locking elements.

3. A locking system for an enclosed structure having a plurality of doors comprising, in combination a lock associated with each door having a bolt spring urged into locked position and retractible against the spring into unlocked position, key actuated tension means connecting said devices for simultaneous movement of the bolts against their springs including mechanism for holding said bolts through said tension means retracted against their springs, and control means other than said key for releasing said tension means.

4. A locking system for an enclosed structure having a plurality of doors for entering and leaving comprising, in combination, a door locking device associated with each door having a lock bolt projectible into locked position and retractible into unlocked position, spring means associated with each bolt urging it toward the locked position, and tension means operatively connecting said devices for simultaneous retraction of their bolts against their springs.

5. A locking system for an enclosed structure having a plurality of doors for entering and leaving comprising, in combination, a door locking device associated with each door having a lock bolt projectible into locked position and retractible into unlocked position, spring means associated with each bolt urging it toward the locked position, and tension means operatively connecting said devices for simultaneous retraction of their bolts against their springs, rotatable key control mechanism coupled with said tension means to actuate it to retract said bolts, and provided with holding means operable therethrough and through said tension means to hold the bolts retracted.

6. A locking system for an enclosed structure having a plurality of doors for entering and leaving comprising, in combination, a door locking device associated with each door having a lock bolt projectible into locked position and retractible into unlocked position, spring means associated with each bolt urging it toward the locked position, and tension means operatively connecting said devices for simultaneous retraction of their bolts against their springs, rotatable key control mechanism coupled with said tension means to actuate it to retract said bolts and provided with holding means operable therethrough and through said tension means to hold the bolts retracted, and means other than the key of said key controlled means for actuating said holding means to release said tension means and bolts to respond to said springs.

7. In a system for locking and unlocking a plurality of doors from a single control, a key operated lock control for the system including a rotatable lock barrel and locking elements in the barrel adapted to lock the barrel against rotation except when the proper key is inserted, and a second control for the system operatively associated with said key operated control and adapted to operate the locking elements in the same manner as the proper key for the control but in the absence of said key.

8. A door locking control mechanism comprising, in combination, a structure, a key operated locking device mounted in said structure including a rotatable lock barrel having a key slot opening out on one side of the structure and a plurality of key retractible locking elements in the barrel yieldingly projectible beyond the circumference thereof, a sleeve in which said lock barrel is rotatable having spaced recessed portions in its inside surface into which said locking elements may project to lock the barrel against rotation, one of said recesses being open through the cylinder to its outside surface so that the locking elements when projecting therein are exposed therethrough, and control means operable from the side of said structure opposite to that upon which the key slot of the barrel opens and having connections adapted to enter the open recess and depress the projecting elements to the same position to which the key would retract the elements.

9. In a system for locking a plurality of doors, a locking device associated with each door having a bolt projectible into locking position and retractible into unlocking position, a cable system operatively connecting said devices together for joint operation, resilient means yieldingly acting upon the cable with a force sufficient to move all the bolts of the devices and adapted when the cable is free for such movement to shift the bolts to one of their positions of movement, manual control means for drawing the cable in the opposite direction against the force of said resilient means and causing the bolts to assume the other position of their movement, means automatically operable when the bolts have been moved by the cable to said last mentioned position to releasably hold the cable against the force of said resilient means acting to move it in the opposite direction, and a manual control member operatively associated with said holding means and adapted upon movement to release the cable from the holding action of said means and permit the cable and the bolts associated therewith to be moved in the direction urged by said resilient means.

10. In a system for simultaneously locking a plurality of vehicle doors, a locking device for each door having a lock bolt movable into and out of locking engagement, a cable control system operatively connecting said devices together for simultaneous actuation of the bolts in one direction, spring means yieldingly opposing movement of the cable in one direction and adapted when the system is free for movement to move the cable and lock bolts in the opposite direction, control mechanism operable to draw the cable in a direction opposing said yielding means, means for locking said control mechanism in position opposed to the action of said yielding means, and push button mechanism in the vehicle operable to free the system to respond to said yielding means.

11. In a system for simultaneously locking a plurality of doors of a vehicle in one operation, a locking device adjacent each door having a lock bolt therein capable of movement into locking engagement with the door with which it is associated, a cable control system operatively connecting said devices together for joint operation, means in each device operable upon movement of said cable control in one direction to retract the lock bolts to withdrawn unlocking position, means in said system yieldingly opposing said unlocking movement and continuously exerting a force upon said cable control and associated operating means to project the lock bolts in said devices into locking engagement with the doors, control mechanism for said system including a movable member separate from said operating means in said devices adapted upon movement in one direction to draw the cable control in the direction to retract said lock bolts to unlocked position against the opposition of said yielding means, means for locking said member in the position assumed when the lock bolts are in retracted condition, and a push button control element in the vehicle adapted upon operation to release the control of said locking means over said member whereby said yielding means will automatically return the cable control and project the lock bolts into locking engagement with the doors of the vehicle.

12. In a motor vehicle having a plurality of doors, a system for locking all the doors of a vehicle in one operation comprising, in combination, a locking device adjacent each door having a lock bolt therein capable of movement from a retracted position allowing the door to be opened to a projected position locking the door, mechanical control means operably connecting all of the devices together for joint operation, means continuously yieldingly acting upon said control means to urge the lock bolts to one position of their movement, means in said control means for releasably locking said lock bolts in the position opposite to that which they are urged by said yielding means, manual control means operable from outside the vehicle to actuate the system against the resistance of said yielding means and to move the lock bolts to the position in which they are releasably locked, and a movable manual control member operable from the inside of the vehicle and adapted upon movement in one direction to release said locking means and allow said yielding means to automatically move the lock bolts to the other position of their movement.

13. Locking mechanism for a motor vehicle including a main system for operating the locking devices of all the doors of the vehicle from a central control unit, an auxiliary system for operating a locking device for a different form of closure member, and means disconnectedly coupling said auxiliary system into said main system so that the auxiliary system may be operated in conjunction with the main system or separate therefrom.

14. Locking mechanism for a motor vehicle including a main remote control system for jointly actuating the locking devices of all the doors of the vehicle body, an auxiliary remote control system for actuating the locking device for a compartment of the vehicle distinct from the body of the vehicle, means exerting force on said systems to operate the same to locking position, means common to both systems for holding the systems in unlocked condition opposed to said operating means, control means for releasing both systems from the control of said common holding means so that they may be operated by said operating means to locking position, and a separate control means operable to release said auxiliary system from said holding means independently of said main system.

15. A vehicle having a plurality of doors, a lock including a bolt spring urged to the locked position associated with each door, key responsive tension means connecting said bolts for simultaneous withdrawal against their springs, mechanism acting through said tension means to hold said bolts retracted against their springs, and means acting in part through said tension means to withdraw a part only of the entire number of bolts controlled by said tension means.

16. A vehicle having a plurality of doors, a lock for each door, each lock having a bolt movable to the locking and unlocking position, a spring urging each bolt to one of said positions, a cable system connecting said bolts for movement against the resistance of their springs in response to the tensioning of the cable including means operable to hold said cable tensioned against the resistance of the bolt springs, control means associated with said cable to tension the same to move all the bolts conrolled thereby as a unit, and additional control means associated with said cable to tension a part thereof to move less than the entire number of bolts controlled thereby.

17. In a door enclosed structure having a plurality of doors for entering and leaving the structure, a system for locking and unlocking the doors simultaneously including a locking device associated with each door having a bolt projectable into locking position and retractable into unlocking position, control means operatively coupling said devices together for joint locking and unlocking operations, key control means operable from the outside of the structure releasably locking the system with the bolts of the devices in one position of their movement, and means manually operable from the inside of the structure for releasing the system from the locking action of said key control means.

18. In a door enclosed structure having a plurality of doors for entering and leaving the structure, a system for locking and unlocking the doors simultaneously including a locking device associated with each door having a bolt projectable into locking position and retractable into unlocking position, mechanical control means operatively coupling said devices together for joint locking and unlocking operations, means yieldingly tending to operate said mechanical control means in one direction and cause all the bolts of the locking devices to shift to one position of their movement, means for releasably holding said mechanical control means against the force of said yielding operating force with the bolts of the devices in the opposite positions of their movement, and means manually operable from the inside of the structure for releasing the system from the control of said holding means to thereby allow the system to automatically operate in the direction it is urged.

19. A locking system for an enclosed structure having a plurality of doors comprising, in combination, a door locking device associated with each door, mechanical control means operatively connecting said devices for joint locking and unlocking operations, means exerting a force tending to operate the connecting control means in one direction, and a control mechanism for the system including a rotatable member operatively coupled to said connecting control means and urged as a result of said force exerting means to rotate in one direction, said rotatable member adapted upon rotation in the opposite direction to cause the connecting means to operate the door locking devices counter to said force exerting means, an element yieldingly projectable from said rotatable member and bodily movable therewith as it is rotated, a body normally depressing said element to a retracted position as the member is rotated but allowing the element to extend to fully projected position and interlock therewith when the member is rotated to a predetermined position in opposition to said force exerting means and thus hold the member against rotation thereby, and a control member operable to depress the yieldable element and allow the member to rotate in the direction urged by said force exerting means.

20. In a vehicle body having a plurality of doors, a door locking system including a locking device associated with each door and operable to positions either locking or unlocking a door, a cable connecting said locking devices for joint operations to either one of said positions, means in said system exerting a yielding force of sufficient strength to operate the locking devices and the cable to one of said positions, manual control means for operating the system including the locking devices and the cable against the force of said yielding means to the other of said positions, mechanism for releasably holding said system in the position to which it is operated by said manual control, and a second manual control means for releasing the hold of said mechanism on the system.

21. In a vehicle body having a plurality of doors, a door locking and unlocking system including a device associated with each door movable to either locking or unlocking position, a cable connecting said devices for joint locking or unlocking operation, means in the system exerting a yielding force sufficient to self-operate the devices and the cable to one of said positions of movement, a rotatable member, means connecting said cable to said rotatable member and operable to tension the cable when the member is rotated in one direction against the resistance of said yielding force exerting means, manual control means for rotating said member against the resistance of said force exerting means, means automatically operable to engage said member and releasably hold the same against the force exerting means when the system is operated to the same position opposite to that toward which it is urged by said force exerting means, and a manual control operable from inside the vehicle to release the hold of said automatic engaging means.

22. In a vehicle having a plurality of doors, a door locking system including a locking device associated with each door to lock and unlock the doors, a bodily reciprocal member in each device movable from a locking position to an unlocking position, an element in each device movable about the axis, means in each device operable upon movement of the element therein in one direction about its axis to cause the member therein to move toward one position of its movement, resilient means in each device opposing said movement of the member and element therein and yieldingly urging the member toward the other position of its movement, a single flexible cable extending between said devices and so connected to the elements therein that when one of the elements is moved against the resistance of said resilient means it simultaneously causes the elements in the other devices to do likewise, manual control means for moving an element in one of said devices against the resistance of said resilient means therein and by virtue of the cable to do likewise in the other devices, means automatically operable to releasably hold said manually controlled element and by virtue of said cable similar elements in other devices against the force of said resilient means when the members have been moved to the operating position opposite to that toward which they are urged by the resilient means, and manual control means operable from inside the vehicle for actuating said automatically operating holding means to release the element which it is adapted to hold and thus allow the system to self operate in the direction urged by said resilient means.

THOMAS H. CLARKSON-JONES.